UNITED STATES PATENT OFFICE.

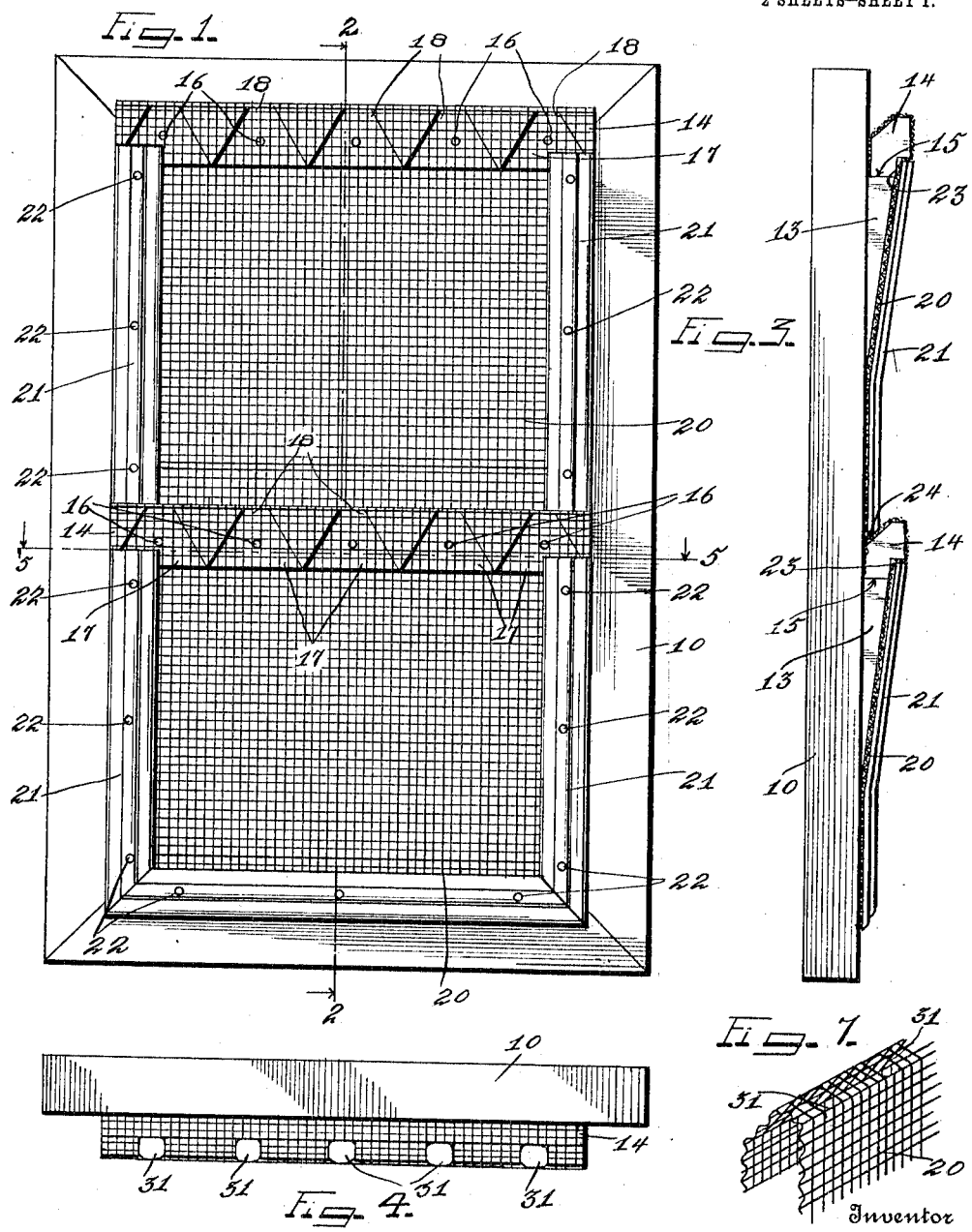

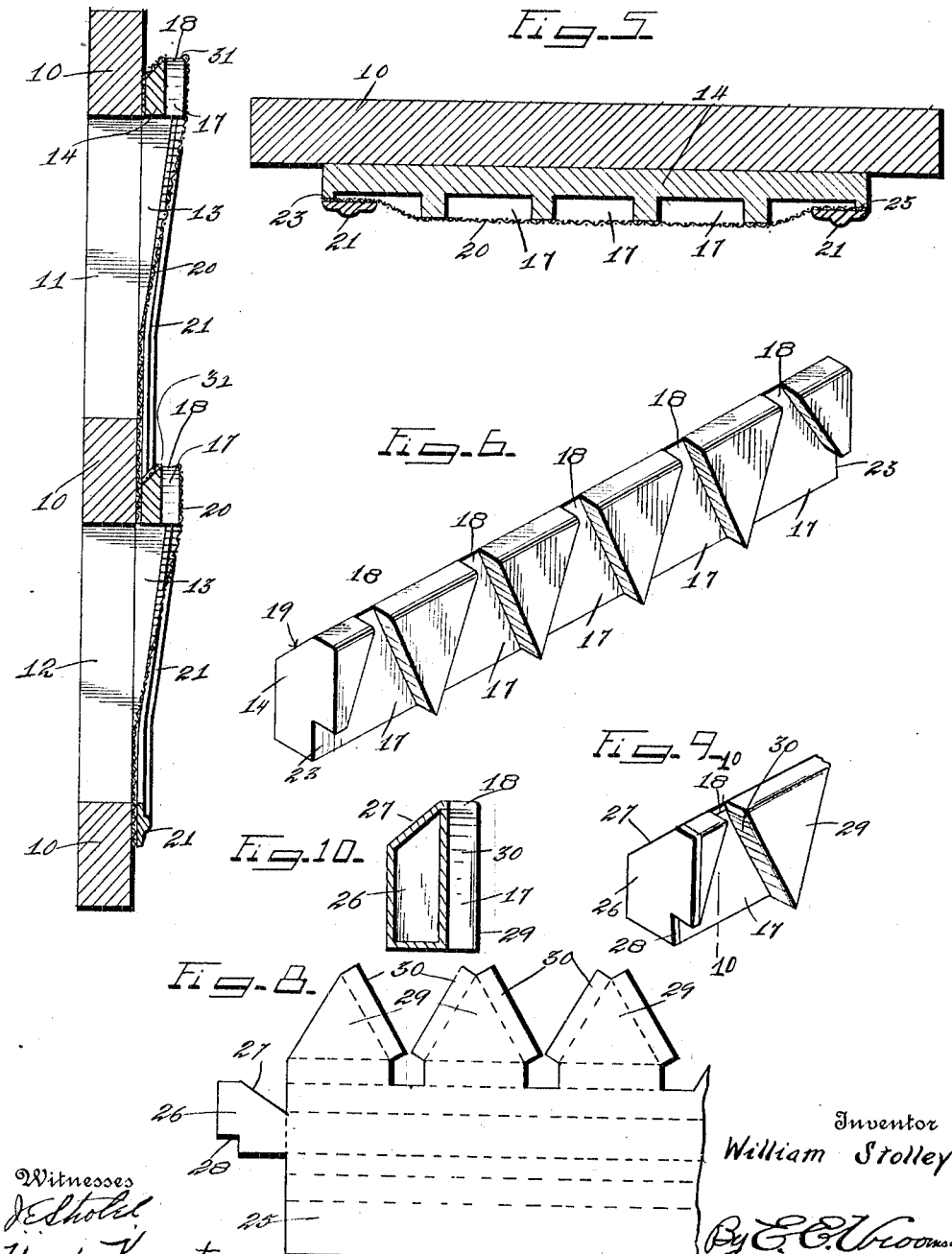

WILLIAM STOLLEY, OF VIVIAN, SOUTH DAKOTA.

FLY-SCREEN.

1,106,010.  Specification of Letters Patent.  Patented Aug. 4, 1914.

Application filed August 16, 1913. Serial No. 785,083.

*To all whom it may concern:*

Be it known that I, WILLIAM STOLLEY, a citizen of the United States, residing at Vivian, in the county of Lyman and State of South Dakota, have invented certain new and useful Improvements in Fly-Screens, of which the following is a specification, reference being had therein to the accompanying drawing.

This invention relates to screens and more particularly to that class of screens that provide exit means for flies.

The object of this invention is to provide such a screen that is so formed that the wire mesh is positioned to guide the flies to the exit means.

Another object of this invention is the production of a novel means of exit for the flies.

A still further object of this invention is the production of the fly exit means formed from a single blank of material.

With these and other objects in view this invention consists of certain novel combinations, constructions and arrangements of parts as will be hereinafter fully described and claimed.

In the accompanying drawings: Figure 1 is a front elevation of the improved screen. Fig. 2 is a section taken on line 2—2 of Fig. 1. Fig. 3 is an end view of the device. Fig. 4 is a top plan view of the improved screen. Fig. 5 is a section taken on line 5—5 of Fig. 1. Fig. 6 is a perspective view of the fly exit bar. Fig. 7 is a perspective view of a portion of the wire mesh showing the exit aperture formed therein. Fig. 8 is a fragmentary plan view of the blank from which the fly exit bar is formed when made of sheet metal. Fig. 9 is a fragmentary perspective view of one end of the fly exit bar when formed from sheet metal. Fig. 10 is a section taken on line 10—10 of Fig. 9.

Referring to the parts by reference numerals, 10 denotes a frame provided with an upper opening 11 and a lower opening 12. Secured to the frame 10 adjacent the side edges of the openings 11 and 12 are substantially V-shaped brackets 13 that support the fly exit bar 14 by having its outer face engaging the lower face 15 of said fly exit bar. This fly exit bar is also secured to the frame by nails or other means, as shown at 16.

Formed on the outer face of the member 14 are upwardly tapering passageways that guide the flies to the openings 18 at the upper end of the tapered passageways 17, this bar 14 also has a tapered or beveled face 19, the purpose of which will be hereinafter set forth.

Mounted on the frame and on the substantially V-shaped spacing brackets 13 is a wire mesh 20 which is securely held to the frame and spacing members by the securing strips 21 that are provided with the securing means 22. These securing strips 22 rest in the cut-out ends 23 of the bar 14. The wire mesh is held tightly between the frame and the V-shaped spacing bar, fly exit bar, and the securing strips 21 and is also brought over and under the securing strips 14, as shown in Figs. 1 and 2, so as to draw the mesh tightly over the openings 11 and 12. The upper strips 21 are provided with beveled faces 24 that fit snugly in the pocket formed by the beveled face 19 of the lower bar 14 and by this construction the upper securing strips are not only held securely but the mesh covering both the upper and lower openings is substantially held upon the frame.

As shown in Figs. 8, 9, and 10, the fly exit bar can be formed from a single blank sheet of material which blank comprises a body 25 with laterally extending ears 26 on both ends, said ears 26 provided with a beveled edge 27 and a cut-out portion 28. The body 25 also carries on one edge a series of substantially V-shaped members 29, said members having flaps 30 that are adapted to be folded so as to form the passageway 17.

It will be seen from the foregoing description that inasmuch as the wire mesh is provided with the apertures 31 that are adapted to be positioned over the openings 18 at the top of the passage 17, that the flies will be guided by the slant of the wire mesh caused by the substantially V-shaped spacing brackets into the passage 17 and through the alined openings 18 and 31.

It is obvious that minor changes may be made in the form and construction of this invention without departing from the spirit thereof. It is therefore not wished to confine the invention to the exact form herein shown and described, but it is wished to include all such as properly come within the scope claimed.

What is claimed, is:

A screen comprising a frame provided with an upper and lower opening, substantially V-shaped spacing blocks adjacent the side edges of said openings in said frame, fly exit bars adjacent the upper edges of said openings, wire mesh over said spacing blocks and said fly exit bars covering said openings, said wire mesh having openings adjacent said fly exit bars, strips positioned on said frame and said spacing blocks, said upper strips having their lower ends fitting beneath the upper tapered face of said lower fly exit bar.

In testimony whereof I hereunto affix my signature in presence of two witnesses.

WILLIAM STOLLEY.

Witnesses:
H. B. HOLMES,
W. M. WILLY.

---

Copies of this patent may be obtained for five cents each, by addressing the "Commissioner of Patents, Washington, D. C."